United States Patent [19]

Oliva et al.

[11] Patent Number: 4,493,241

[45] Date of Patent: Jan. 15, 1985

[54] DEVICE OPERATING BY MEANS OF PYROTECHNIC CHARGES FOR RELEASING JOINTS SUBJECT TO LOAD

[75] Inventors: Rudolf Oliva, Cremlingen; K. Ulf Schmidt, Brunswick, both of Fed. Rep. of Germany

[73] Assignee: Deutsche Forschungs- und Versuchsanstalt fur Luft- und Raumfahrt e. V., Cologne, Fed. Rep. of Germany

[21] Appl. No.: 463,926

[22] Filed: Feb. 3, 1983

[30] Foreign Application Priority Data

Mar. 9, 1982 [DE] Fed. Rep. of Germany ....... 3208401

[51] Int. Cl.³ .............................................. F42B 3/00
[52] U.S. Cl. ..................................... 89/1.14; 60/636
[58] Field of Search ................. 89/1 B, 1 R; 102/378; 60/636

[56] References Cited

U.S. PATENT DOCUMENTS

| | | | |
|---|---|---|---|
| 3,071,404 | 1/1963 | Van Hove | 89/1 B X |
| 3,084,597 | 4/1963 | Beger | 60/636 X |
| 3,200,706 | 8/1965 | Kinard | 89/1 B |
| 3,405,593 | 10/1968 | Kriesel | 89/1 B X |
| 3,910,154 | 10/1975 | Gardner | 89/1 B X |
| 4,028,990 | 6/1977 | Waide | 89/1 B |

*Primary Examiner*—David H. Brown
*Attorney, Agent, or Firm*—Salter & Michaelson

[57] ABSTRACT

A device is described which operates with pyrotechnic charges to release joints under load effected between a plurality of constructional components and including bolts acted on by transverse forces. An example of such a device is for the separation of the rotor blades of a helicopter in order to be able to eject the crew upwards from the helicopter by an escape system without danger on failure of the helicopter to fly. The bolts of the joint are connected to a housing having a cylindrical bore of which the axis lies substantially in the direction of the resultant of the forces necessary to release the joint by extracting the bolts. On one of the constructional components there is a piston which supports itself on said component and engages in a cylindrical bore of the housing. The pyrotechnic charge is situated in the space between the end of the piston and the base of the cylinder bore. An ignition device for the pyrotechnic charge is provided on the housing.

5 Claims, 2 Drawing Figures

DEVICE OPERATING BY MEANS OF PYROTECHNIC CHARGES FOR RELEASING JOINTS SUBJECT TO LOAD

FIELD OF THE INVENTION

The invention relates to a device, operating by means of pyrotechnic charges, for releasing joints, subject to load, between a plurality of constructional components connected by means of bolts acted on by transverse forces.

In the operation of apparatus and plants, for example in air or space travel, in shipping, especially in submarines, and in nuclear power plants such as nuclear generators, emergency situations may arise in which joints which include bolts loaded with transverse forces must be disconnected by remote control in times in the order of magnitude of milliseconds.

An example is the separation of the rotor blades of a helicopter as is necessary in the case of inability to fly to effect ejection of the crew from the helicopter without danger by means of an escape system.

DESCRIPTION OF THE PRIOR ART

A mechanism is known for severing the rotor blades in which pyrotechnic charges, which act on the hollow charge principle, are mounted on the rotor blades or on the rotor blade mounting. The rotor blades or the rotor blade mountings are broken off by detonation of the charges and the rotor blades are in this way released. In this case detonation leads to a considerable scattering of parts which may endanger both the crew and the escape system. It is possible, in a similar manner, by the use of pyrotechnic cutting charges to cut through loaded mounting supports, for example supporting members by means of which slides, or closure members similar to slides, are maintained in the closed or open state as the case may be against the action of stressed driving means, said slides then being moved by said drive into the open or closed position after removing a locking member. However, even this is possible only when the above mentioned disadvantages (detonation wave, parts scattering, destruction of constructional components) are allowed for.

It is an object of the invention to design a device of the type as described above in which it is possible to release the constructional components without damage, in particular to release them without detonation and without the formation of splinters or other parts having momentum.

SUMMARY OF THE INVENTION

This object is solved according to the invention in that device includes a housing in the form of a bridge to which the bolts of the joint are connected the housing having a cylindrical bore of which the axis lies substantially in the direction of the resultant of the forces required to release the joint by extracting the bolts; a piston supported on one of the constructional components and an ignition device for the pyrotechnic charge.

The pyrotechnic charge is conveniently accommodated in a space between the end of the piston remote from said one constructional component and a closed end of the cylinder bore adjacent said remote piston end.

The cylindrical bore may be closable by a screwed cap forming one end of said cylindrical bore. The ignition device may be arranged on said screwed cap.

Each bolt may be secured by means comprising a collar arranged on the end of each said bolt remote from said housing; a shearing pin extending transversely through said bolt and said collar and an external thread on said collar and arranged to bear against an adjacent one said constructional components.

BRIEF DESCRIPTION OF THE DRAWINGS

An embodiment of the invention is illustrated in the drawings by way of example and is described in detail in the following with reference to the drawings, in which.

DESCRIPTION OF THE PREFERRED EMBODIMENT

Figure 1:
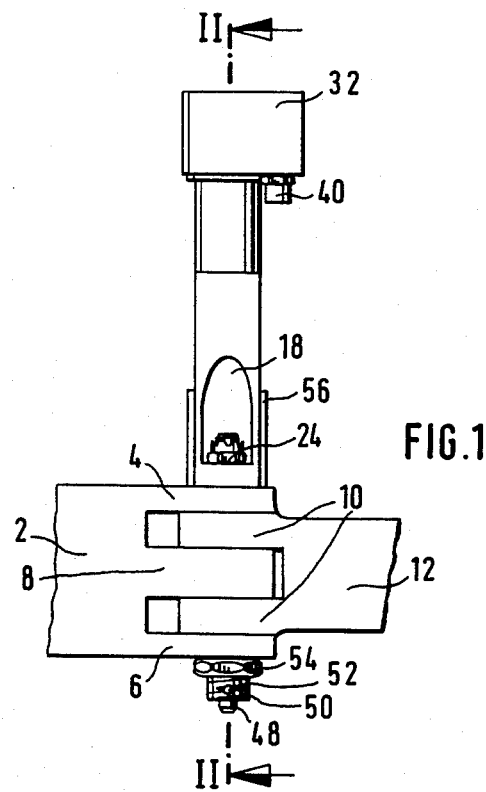
FIG. 1 shows in side view a joint between a rotor arm and a rotor blade of a helicopter, fitted with a separate device according to the invention.
Figure 2:
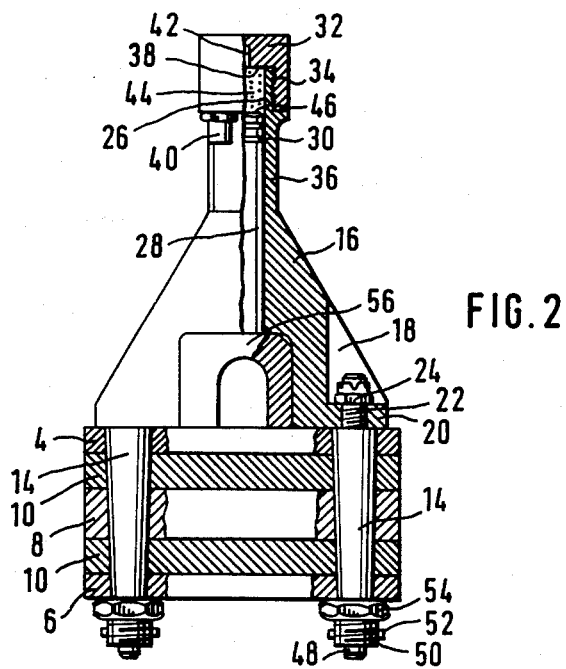
FIG. 2 shows the front view, half cut away along the line II—II shown in FIG. 1.

FIG. 1 shows the joint end of a rotor arm 2 of a helicopter which is provided at its end with lands 4, 6 and 8 spaced apart from one another and between which two corresponding spaced lands 10 of the rotor balde mounting 12 engage. The joint between the rotor arm and the rotor blade is made by means of two conical bolts 14 spaced apart from one another and which are inserted in suitably aligned bores in the lands. The connecting bolts 14 as illustrated in FIG. 1 are loaded by the forces which act on the bolts as transverse forces. The length of the bolts is 100 mm in a known configuration of helicopter and the transverse forces are about 100 kN.

A housing 16 is arranged on the upper land 4 of the rotor arm 2. This housing has recesses 18 therein which form flanges 20 in which there are arranged bores through which a threaded section 22 of each bolt 14 is led. Each bolt 14 is firmly attached to the housing 16 by means of this threaded section and a nut 24.

Centrally between the axes of the bolts 14 there is a cylindrical bore 26 in the housing in which there engages a piston 28 designed as a simple cylindrical rod able to support itself at its lower end on the outer side of the land 4. At its upper end the piston 28 is sealed against the wall of the cylinder bore 26 by a sealing ring 30, which may, for example, be an O-ring. The cylinder space 44 is closed at its upper end by a screw cap 32 screwed on to an external thread 34 of a tubular extension 36 of the housing 16 and contains a pyrotechnic charge therein. The base 38 of the screw cap 32 forms the base of the cylinder. An ignition device 40 is arranged on the screw cap 32 and is conveniently screwed into an extension of the cap 32. This ignition device 40 is connected with the cylindrical space 44 in which the pyrotechnic charge is located, the space 44 being disposed between the base 38 of the cylinder and the end 46 of the piston rod 28. Communicating with the space 44 is an ignition channel 42 which provides for igniting of the pyrotechnic charge in the space 44 by said ignition device 40.

At the lower end of each of the bolts 14 there is a smooth cylindrical extension 48 on which there is mounted a collar 50 connected to the cylindrical extensions 48 by means of a shearing pin 52. The collar 50 is provided externally with a thread on to which a locking nut 54 is screwed thus fixing the conical bolts 14.

In order to release the rotor blades 12 from the rotor arm 2 the ignition device is activated and the charge in the cylinder space 44 is thus caused to explode. The compressed gases produced in the explosion impinge on the piston 28 and force the housing 16 upwards. Thereby both bolts 14 are pulled out of the bores in the lands through which they extend, after the shearing pins 52 at the lower ends of the bolts have been broken. If the effective length of the piston 28 is at least equal to the effective length of the bolts 14, the bolts 14 are pulled out of the bores in the lands over the whole length of the bolts thus severing the rotor blades from the rotor arms mounted on the rotor head. Severing occurs within a very short time, approximately 3 ms.

The housing 16 with the connecting bolts 14 attached to it is accelerated in a direction substantially parallel with the axis of rotation of the rotor and thus does not endanger the crew when leaving the helicopter by means of the rescue system, the direction of motion of which is substantially similar. Fundamentally it would also be possible to provide means to prevent the housing flying off.

In the embodiment illustrated, the piston 28 is supported on a bridge member 56 which extends over constructional elements on the rotor arms, not shown in the drawings. The housing 16 is here provided with a suitable recess to accomodate the bridge member 56. The piston 28 is conveniently fixed rigidly to the bridge member 56. Connection of the piston 28 to the land 4 on which it is supported or of the bridge member 56 to this element is not necessary for breaking the joint but may be convenient in order to prevent uncontrolled movements of said piston.

In a manner similar to that for a joint with two bolts, the device may also be designed for joints with three, four or even more bolts. In such a case, the housing may be designed in the form of a star or also, for example, with a flange plate to which all the bolts are attached. It is important that substantially equal tensile force should be exerted on each bolt and thus the axis of the cylindrical bore is situated substantially in the direction of the resultant of the forces necessary for release of the connection.

What we claim as our invention and desire to secure by Letters Patent of the United States is:

1. A device, acting by means of a pyrotechnic charge, for the release of at least one joint between a plurality of constructional components subject to load, including a plurality of bolts acted on by transverse forces, the device comprising a housing to which the bolts are connected having a cylindrical bore therein, the axis of which lies substantially in the direction of the resultant of the forces necessary to release the joint by extracting said bolts, a piston supported on one of the constructional components and engaging in the cylindrical bore of said housing, a pyrotechnic charge positioned to act on said piston, and an ignition device for said pyrotechnic charge.

2. A device according to claim 1 in which the pyrotechnic charge is accommodated in a space between the end of the piston remote from said one constructional component and a closed end of the cylinder bore adjacent said remote piston end.

3. A device according to claim 1 in which each said bolt is secured by means comprising a collar arranged on the end of each said bolt remote from said housing; a shearing pin extending transversely through said bolt and said collar, and an external thread on said collar that receives a locking member that is arranged to bear against an adjacent one of said constructional components.

4. A device according to claim 1 in which the cylindrical bore is closable by a screwed cap forming one end of said cylindrical bore.

5. A device according to claim 4 in which said ignition device is arranged on said screwed cap.

* * * * *